United States Patent
Yang et al.

(10) Patent No.: US 9,332,418 B2
(45) Date of Patent: May 3, 2016

(54) METHOD OF SWITCHING DATA NETWORK FOR NETWORK APPARATUS, NETWORK APPARATUS, AND NETWORK SYSTEM

(75) Inventors: Kuo-Long Yang, Taichung (TW); Tzu-Chiang Yen, Hsinchu (TW)

(73) Assignee: ZyXEL communications Corp., Hsinchu Science Park, Hsinchu (TW)

( * ) Notice: Subject to any disclaimer, the term of this patent is extended or adjusted under 35 U.S.C. 154(b) by 304 days.

(21) Appl. No.: 13/474,711

(22) Filed: May 18, 2012

(65) Prior Publication Data

US 2013/0142112 A1    Jun. 6, 2013

Related U.S. Application Data

(60) Provisional application No. 61/566,703, filed on Dec. 5, 2011.

(51) Int. Cl.

| | |
|---|---|
| *H04W 4/00* | (2009.01) |
| *H04W 36/22* | (2009.01) |
| *H04W 36/24* | (2009.01) |
| *H04W 8/18* | (2009.01) |
| *H04W 4/02* | (2009.01) |
| *H04W 88/06* | (2009.01) |
| *H04W 48/18* | (2009.01) |

(52) U.S. Cl.
CPC .............. *H04W 8/183* (2013.01); *H04W 4/003* (2013.01); *H04W 4/021* (2013.01); *H04W 36/24* (2013.01); *H04W 48/18* (2013.01); *H04W 88/06* (2013.01)

(58) Field of Classification Search
CPC ..... H04W 80/04; H04W 80/12; H04W 88/06; H04W 88/18; H04W 36/00; H04W 36/08; H04W 36/0011; H04W 36/22; H04W 36/24; H04W 36/30; H04W 36/365; H04W 72/02; H04W 72/04; H04W 72/0446; H04W 72/0453
See application file for complete search history.

(56) References Cited

U.S. PATENT DOCUMENTS

| | | | |
|---|---|---|---|
| 6,978,144 B1 * | 12/2005 | Choksi ............... | H04L 47/6215 370/329 |
| 7,788,401 B2 | 8/2010 | Hussain | |
| 8,179,861 B2 * | 5/2012 | Wohlert ............... | H04W 36/04 370/331 |
| 8,195,175 B2 * | 6/2012 | Govindan ............ | H04L 47/10 455/410 |
| 8,275,377 B2 * | 9/2012 | Nanda et al. .................. | 455/436 |
| 8,311,543 B2 * | 11/2012 | Dravida ............... | H04W 36/30 370/338 |

(Continued)

FOREIGN PATENT DOCUMENTS

TW    200743332    11/2007

*Primary Examiner* — Candal Elpenord
(74) *Attorney, Agent, or Firm* — Winston Hsu; Scott Margo (57) ABSTRACT

A network apparatus and a method of switching a data network for a network apparatus are provided. The network apparatus includes a plurality of User Identity Modules (UIMs), a transceiver module, and a switching unit. The UIMs are used to provide a plurality of network service plans, wherein the network apparatus operates in a first network service plan corresponding to a first UIM of the UIMs. The transceiver module is arranged to receive a plurality of network packets corresponding to the network service plans. The switching unit is arranged to obtain a plurality of corresponding network connection information from the network packets, performing an information-matching operation upon the plurality of corresponding network connection information to generate a matching result by referring to a profile database, and determining if the network apparatus is required to be switched to operate in a second network service plan according to the matching result.

20 Claims, 8 Drawing Sheets

(56) References Cited

U.S. PATENT DOCUMENTS

| | | | |
|---|---|---|---|
| 8,391,918 B2 * | 3/2013 | Ekici et al. | 455/552.1 |
| 8,605,678 B2 * | 12/2013 | Karaoguz | H04W 8/20 370/331 |
| 8,705,442 B2 * | 4/2014 | Osborn | H04L 63/08 370/328 |
| 8,887,257 B2 * | 11/2014 | Haggerty | H04L 63/0272 726/9 |
| 2004/0224714 A1 * | 11/2004 | Posti | H04W 4/00 455/522 |
| 2005/0288021 A1 * | 12/2005 | Hunkeler | H04W 48/10 455/436 |
| 2006/0114871 A1 * | 6/2006 | Buckley et al. | 370/338 |
| 2010/0150102 A1 * | 6/2010 | Li et al. | 370/331 |

* cited by examiner

METHOD OF SWITCHING DATA NETWORK FOR NETWORK APPARATUS, NETWORK APPARATUS, AND NETWORK SYSTEM

CROSS REFERENCE TO RELATED APPLICATIONS

This application claims the benefit of U.S. provisional application No. 61/566,703, which was filed on Dec. 5, 2011 and entitled "APPARATUS AND METHODS FOR USING MULTIPLE USER IDENTITY MODULES". The entire content of the related application is incorporated herein by reference.

BACKGROUND OF THE INVENTION

1. Field of the Invention

The disclosed embodiments of the present invention relate to a network apparatus, and more particularly, to a network apparatus which may perform an information-matching operation upon a plurality of network service plans provided by a plurality of User Identity Modules (UIMs) for switching a data network automatically or manually, and related switching method.

2. Description of the Prior Art

Nowadays, a variety of network devices provide interfaces for connecting a wireless modem card with a User Identity Module (UIM), allowing a user to access the Internet through wireless or mobile networks such as WiFi, 2G, 3G, and 4G networks. Some of the network devices have built-in wireless modems, meaning a user can access the Internet with UIMs enabled by service plans from specific service providers.

There are several disadvantages in the current design of such network devices. For a mobile user, especially one who travels between different areas frequently, expensive data roaming charges may occur. Besides, the user may not be able to connect to desired services if the original subscribed service provider does not provide enough service coverage, or does not have roaming agreements with other service providers. Furthermore, the coverage problem becomes much more severe as emerging mobile access technologies (e.g. 4G/LTE) may only be available in limited service areas in the early stage of deployment.

To resolve these problems, a mobile user may need to carry several UIMs when traveling, wherein a different UIM will be employed in the network device depending on where the user is currently located. In order to determine which UIM to employ, the user has to rely on individual judgment as well as limited information from the network device. In some areas, even though the user could use the original UIM to access a WiFi hotspot service (e.g. through EAP-SIM authentication provided by the service provider), he still needs to manually switch service plans between WiFi hotspot and 2G/3G/4G with limited choices. The user may even need to use another network device with a different service plan enabled to access the Internet in a different zone.

SUMMARY OF THE INVENTION

In accordance with exemplary embodiments of the present invention, a network apparatus which may automatically switch to an optimal network service plan according to different communication environments and provide a user with suggestion of available service plans, and related switching method thereof are provided to solve the above-mentioned problems.

According to the first aspect of the present invention, a network apparatus is disclosed. The network apparatus includes a plurality of UIMs, a transceiver module, and a switching unit. The UIMs are used to provide a plurality of network service plans, wherein the network apparatus operates in a first network service plan corresponding to a first UIM of the UIMs. The transceiver module is arranged to receive a plurality of network packets corresponding to the network service plans. The switching unit is coupled to the UIMs and the transceiver module, and is arranged to obtain a corresponding plurality of network connection information from the network packets, performing an information-matching operation upon the plurality of network connection information to generate a matching result by referring to a profile database, and determining if the network apparatus is required to be switched to operate in a second network service plan according to the matching result.

According to the second aspect of the present invention, a network system is disclosed. The network system includes a network apparatus and a user interface. The network apparatus is identical to the aforementioned network apparatus, and generates a selectable list of available network service plans according to the matching result. The user interface is used to display the selectable list, receive a selection signal corresponding to the selectable list, and transmit the selection signal to the network apparatus, wherein the switching unit determines if the network apparatus is required to be switched to operate in a second network service plan according to the selection signal.

According to the third aspect of the present invention, a method of switching a data network for a network apparatus is disclosed. The network apparatus includes a plurality of UIMs, the UIMs are used for providing a plurality of network service plans, and the network apparatus operates in a first network service plan of a first UIM of the UIMs. The method includes the following steps: receiving a plurality of network packets corresponding to the network service plans for obtaining a plurality of network connection information corresponding to the network service plans; performing an information-matching operation upon the plurality of network connection information to generate a matching result by referring to a profile database; and determining if the network apparatus is required to be switched to operate in a second network service plan according to the matching result.

These and other objectives of the present invention will no doubt become obvious to those of ordinary skill in the art after reading the following detailed description of the preferred embodiment that is illustrated in the various figures and drawings.

DETAILED DESCRIPTION

The concept of the present invention is to perform an information-matching operation upon network connection information corresponding to all available network service plans, and then either a network apparatus can be automatically switched to operate in an optimal network service plan under different communication environments, or suggestions for the available network service plans are provided to a user for selecting a preferred network service plan. Further description is detailed as follows.

Figure 1:
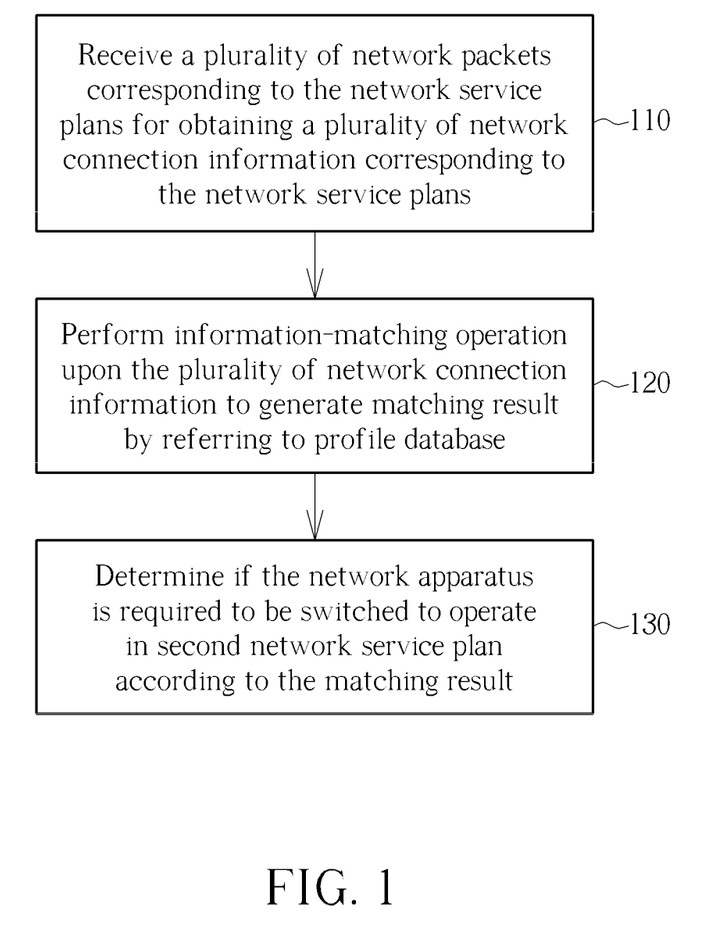
FIG. 1 is a flowchart illustrating an exemplary generalized method of switching a data network for a network apparatus according to an embodiment of the present invention.
Figure 2:
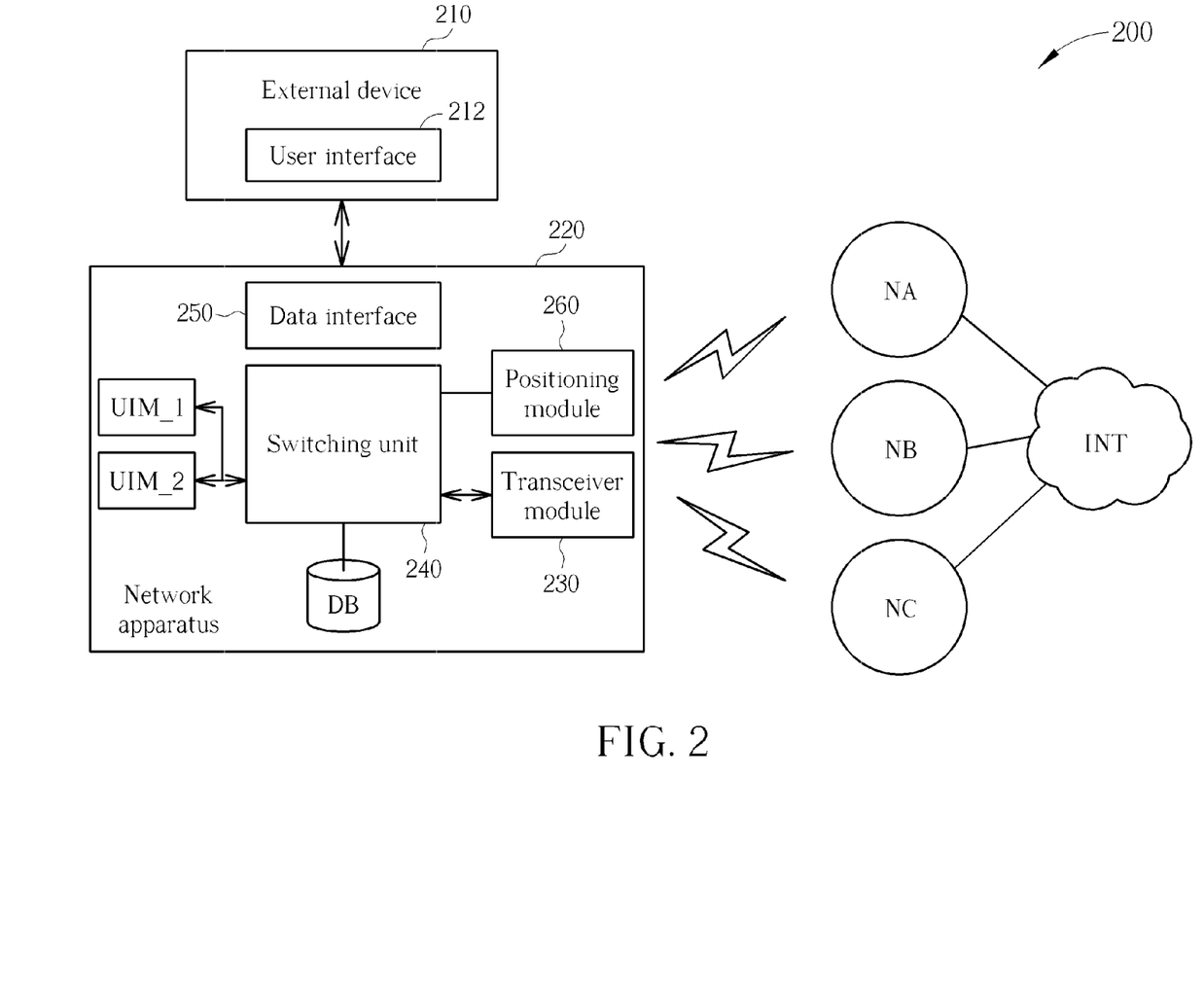
FIG. 2 is a diagram illustrating an exemplary network apparatus which employs the method shown in FIG. 1 to switch data networks in a network system.

Please refer to FIG. 1 and FIG. 2 together. FIG. 1 is a flowchart illustrating an exemplary generalized method of switching a data network for a network apparatus according to an embodiment of the present invention, and FIG. 2 is a diagram illustrating a network apparatus 220 which employs the method shown in FIG. 1 to switch a data network in a network system 200. The network apparatus 220 includes a plurality of UIMs UIM_1 and UIM_2, a transceiver module 230, and a switching unit 240. Please note that the number of UIMs is for illustrative purposes only, and is not meant to be a limitation of the present invention. The UIMs UIM_1 and UIM_2 are used to provide a plurality of network service plans. More practically, a first UIM UIM_1 is used to provide a first network service plan (i.e., a network service plan NA), and a second UIM UIM_2 is used to provide a network service plan NB and a network service plan NC. In addition, the network apparatus 220 currently operates in the network service plan NA. The switching unit 240 is coupled to the UIM UIM_1, the UIM UIM_2, and the transceiver module 230. The transceiver module 230 is arranged to receive a plurality of network packets corresponding to the network service plans NA-NC, and the switching unit 240 is arranged to obtain a plurality of corresponding network connection information from the network packets (as shown in step 110). Next, the switching unit 240 performs an information-matching operation upon the plurality of network connection information to generate a matching result by referring to a profile database DB (as shown in step 120), and determines if the network apparatus 220 currently operating in the network service plan NA is required to be switched to operate in a second network service plan (e.g., the network service plan NB or the network service plan NC) according to the matching result (as shown in step 130), wherein the profile database DB may include information such as categories, usage priorities, signal strength, data throughput, or service rates of network service plans, or geographical location of the network apparatus 220.

In one implementation, any one of the UIMs included in the network apparatus 220 may be a Subscriber Identity Module (SIM), a Universal Subscriber Identity Module (USIM), a Universal Integrated Circuit Chip (UICC), or a Removable User Identity Module (RUIM). In addition, any one of the network service plans may be a WiFi service or a mobile data service for the network apparatus 220 to access the Internet INT.

Figure 3:
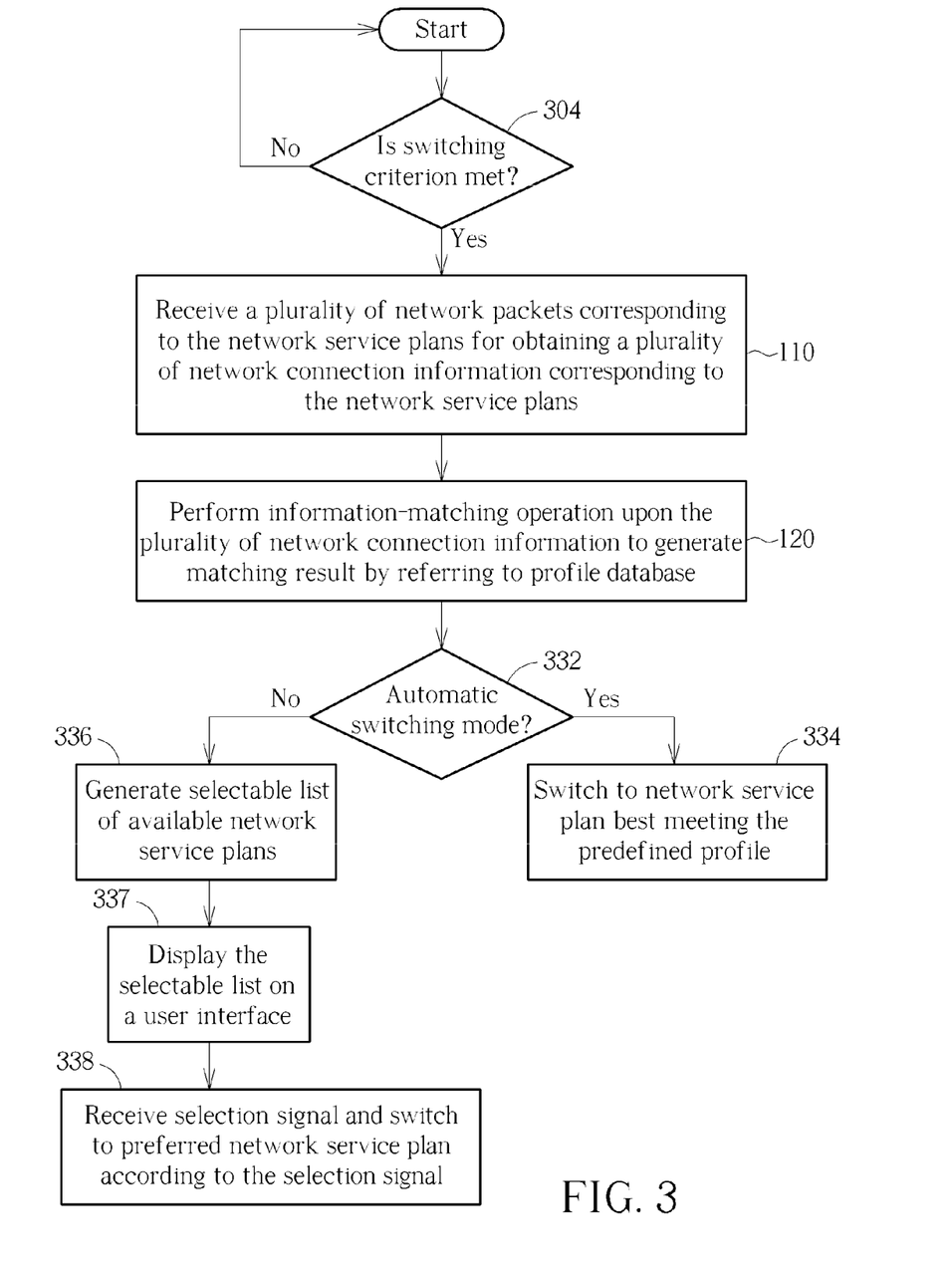
FIG. 3 is a flowchart illustrating an exemplary method of switching a data network for a network apparatus according to an embodiment of the present invention.

In one embodiment, the switching unit 240 may further determine if a switching criterion is met, wherein only when the switching criterion is met, the switching unit 240 is activated to execute related steps shown in FIG. 1. Please refer to FIG. 2 in conjunction with FIG. 3. FIG. 3 is a flowchart illustrating an exemplary method of switching a data network for a network apparatus according to an embodiment of the present invention, wherein the method shown in FIG. 3 is based on the steps shown in FIG. 1. The network apparatus 220 may further include a data interface 250 and a positioning module 260, wherein the data interface 250 may be a wireless interface, an Ethernet interface, or a USB interface, and the positioning module 260 may be a GPS module or an AGPS module. The data interface 250 is coupled to the switching unit 240 and arranged to connect an external device 210 (e.g. a client terminal such as a mobile device), and the positioning module 260 is coupled to the switching unit 240 and arranged to determine position of the network apparatus 220.

In one implementation, the switching unit 240 may determine if the switching criterion is met by detecting if a switching signal transmitted from the external device 210 is received from the data interface 250 (as shown in step 304), wherein the switching unit 240 determines that the switching criterion is met when receiving the switching signal. In another embodiment, the switching unit 240 may determine if the switching criterion is met by detecting if the position of the network apparatus 220 meets a predefined profile (as shown in step 304). For example, when the location of the network apparatus 220 is outside a service area of the network service plan NA or is covered by service area(s) of other network service plan(s) in predefined profile (e.g., the network service plan NB), the switching criterion is met. In another implementation, the switching unit 240 may determine if the switching criterion is met by detecting if network connection information of the network service plan NA meets the predefined profile (as shown in step 304), wherein the switching unit 240 determines that the switching criterion is met when the network connection information of the network service plan NA does not meet the predefined profile. For example, when the service charge of the network service plan NA is higher than the preset quota of the predefined profile, the switching criterion is met.

When the above-mentioned switching criterion is met, the switching unit 240 then obtains the plurality of corresponding network connection information from the network packets received by the transceiver module 230 (as shown in step 110). In one implementation, the switching unit 240 may obtain the plurality of corresponding network connection information from the network packets by referring to the profile database DB, wherein the profile database DB may further include service specifications or charge rates of the network service plans NA-NC. For example, in a case where the switching unit 240 is configured to refer to the preset quota of the profile database DB for determining if the data network is required to be switched, and the profile database DB includes service specifications (e.g., categories or ideal access throughput of network service plans) or charge rates (e.g., rates of various streaming volumes) of the network service plans NA-NC, the switching unit 240 may obtain the service charges of the network service plans NA-NC by referring to the profile database DB to thereby perform the information-matching operation. When the matching result indicates that the network service plan NB best meets the predefined profile (e.g., the service charge is lower than a predefined data charge and the access throughput is higher than a preset access throughput), the switching unit 240 switches the network apparatus 220 to the network service plan NB from the network service plan NA. In one implementation, the predefined profile may be stored in the profile database DB.

Moreover, the exemplary methods of switching a data network for a network apparatus shown in FIG. 1 and FIG. 3 may be employed in switching between network service plans corresponding to the same UIM, and may also be employed in switching between network service plans corresponding to different UIMs. For example, in a case where a network apparatus operating in a first network service plan of a first UIM is switched to operate in a second network service plan, the second network service plan which is different from the first network service plan may be provided by a second UIM different from the first UIM, or may be provided by the first UIM.

Please note that the method of switching a data network for a network apparatus may be performed in an automatic switching mode or a manual switching mode. For example, when the network apparatus 220 operates in the automatic switching mode, the switching unit 240 may switch the network apparatus 220 currently operating in one network service plan to another network service plan best meeting the predefined profile among the network service plans (as shown in steps 332 and 334). When the network apparatus 220 operates in the manual switching mode, the switching unit 240 may generate a selectable list of available network service plans according to the matching result, display the selectable list on a user interface 212, and receive a selection signal corresponding to the selectable list for determining if the network apparatus 220 currently operating in one network service plan is required to be switched to operate in another network service plan according to the selection signal (as shown in steps 332, 336, 337, and 338). In brief, in order to facilitate the user selection of a preferred network service plan, the switching unit 240 may further send the matching result and the selectable list complying with a user interface format to the external device 210 by interacting through the data interface 250. Please note that the user interface 212 is an optional component, and is not required to be inside the external device 210. In an alternative design, as the network apparatus 220 may determine switching criterion by itself, the user interface 212 may be omitted. In another alternative design, the user interface 212 may also be inside the network apparatus 220.

Figure 4A:
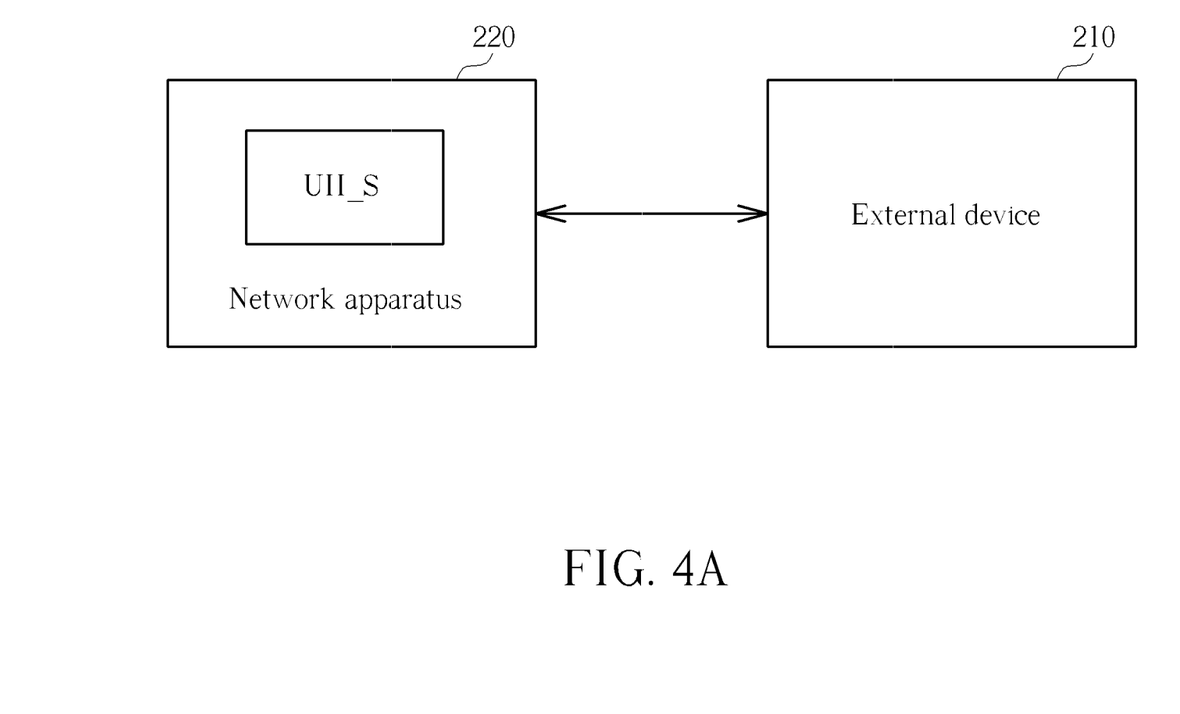
FIG. 4A is a diagram illustrating interaction between the external device and the network apparatus shown in FIG. 2 according to a first implementation of the present invention.

Please refer to FIG. 4A, which is a diagram illustrating interaction between the external device 210 and the network apparatus 220 shown in FIG. 2 according to a first implementation of the present invention. In this implementation, the switching unit 240 (not shown in FIG. 4A) of the network apparatus 220 may send the matching result and the selectable list complying with a user interface format to the external device 210. For example, the switching unit 240 may send the matching result and the selectable list complying with a user interface format (e.g., HTML/XML) to the external device 210 by executing user interface interaction software UII_S built-in the network apparatus 220. In addition, a user interface (not shown in FIG. 4A) of the external device 210 is used to display the matching result and the selectable list, receive a selection signal corresponding to the selectable list, and transmit the selection signal to the network apparatus 220. Next, the switching unit 240 switches the network apparatus 220 currently operating in a network service plan to a user-selected network service plan according to the selection signal.

Figure 4B:
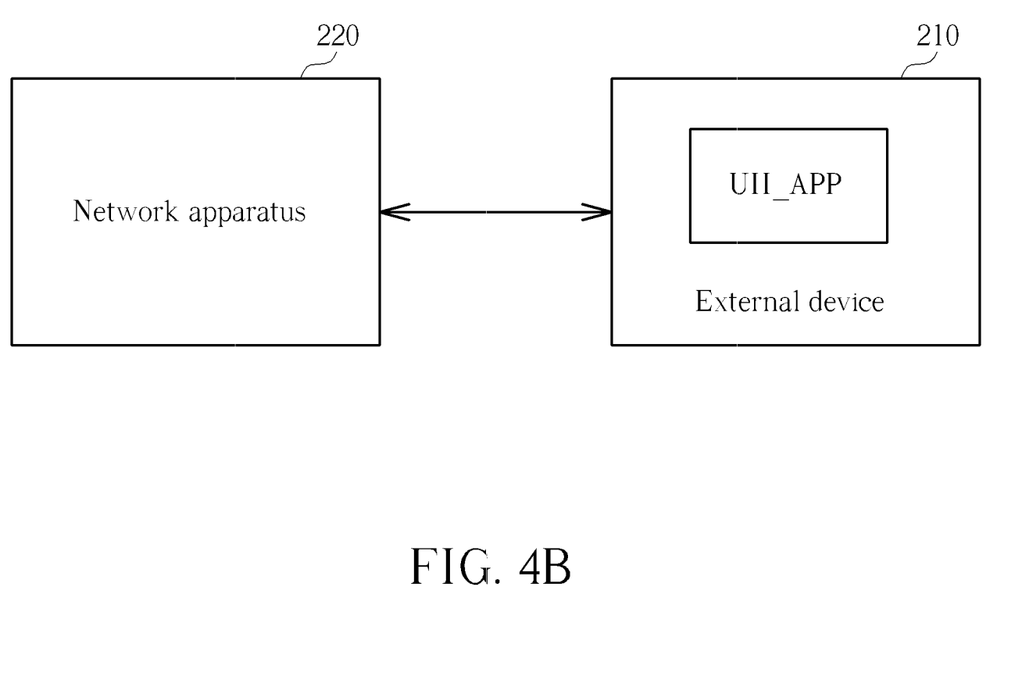
FIG. 4B is a diagram illustrating interaction between the external device and the network apparatus shown in FIG. 2 according to a second implementation of the present invention.

Please refer to FIG. 4B, which is a diagram illustrating interaction between the external device 210 and the network apparatus 220 shown in FIG. 2 according to a second implementation of the present invention. In this implementation, the aforementioned interaction operation may be executed directly by a user interface interaction application UII_APP installed in the external device 210. To put it another way, the external device 210 may display the matching result and the selectable list (which is sent by the network apparatus 220 and complies with a user interface format of the external device 210) on a user interface (not shown in FIG. 4B) of the external device 210 by executing the user interface interaction application UII_APP. In addition, the user interface of the external device 210 is used to receive a selection signal corresponding to the selectable list, and transmit the selection signal to the network apparatus 220. Next, the switching unit 240 may determine if the network apparatus 220 currently operating in a network service plan is required to be switched to operate in a user-selected network service plan according to the selection signal.

Figure 4C:
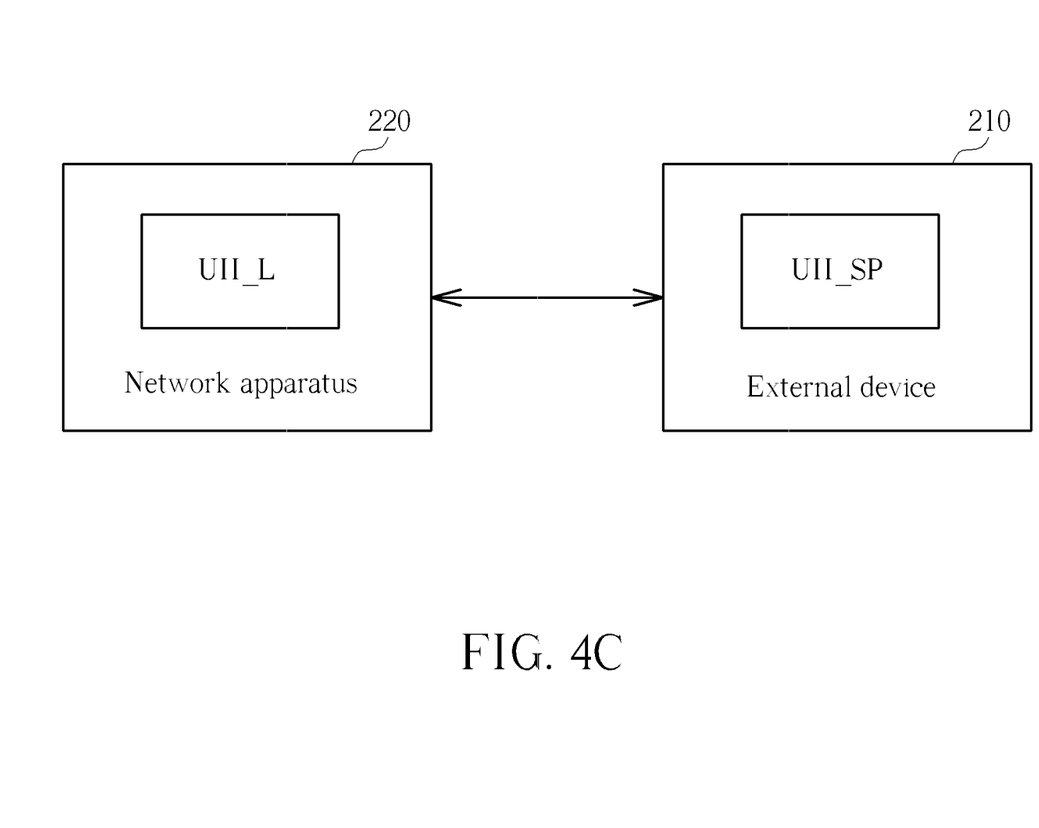
FIG. 4C is a diagram illustrating interaction between the external device and the network apparatus shown in FIG. 2 according to a third implementation of the present invention.

Please refer to FIG. 4C, which is a diagram illustrating interaction between the external device 210 and the network apparatus 220 shown in FIG. 2 according to a third implementation of the present invention. In this implementation, the aforementioned interaction operation may be executed through the external device 210 and the network apparatus 220. For example, a user interface interaction software package UII_SP installed in the external device 210 may display the matching result and the selectable list (which is sent by the network apparatus 220 and complies with a user interface format of the external device 210) on a user interface (not shown in FIG. 4C) of the external device 210 by utilizing a user interface interaction library UII_l included in the network apparatus 220. In addition, the user interface of the external device 210 is used to receive a selection signal corresponding to the selectable list, and transmit the selection signal to the network apparatus 220. Next, the switching unit 240 may switch the network apparatus 220 currently operating in a network service plan to a user-selected network service plan according to the selection signal.

In brief, in a case where the matching result indicates that a network service plan currently used in the network apparatus 220 is required to be switched, when the external device 210 has a user interface and the network apparatus 220 operates in the automatic switching mode, the aforementioned switching message may be displayed on the user interface to notify the user; when the external device 210 has a user interface and the network apparatus 220 operates in the manual switching mode, and the switching message has been displayed on the user interface, network service plan switching can be performed after the selection signal is received. In an alternative design, if the network apparatus 220 operating in the manual switching mode does not receive the selection signal during a predefined period since the aforementioned switching message is displayed on the user interface, the network apparatus 220 may keep operating in the original network service plan, or may be automatically switched to operate in a network service plan best meeting the predefined profile.

It should be noted that, besides the matching result and the selectable list, the user interface of the external device 210 shown in FIGS. 4A/4B/4C may display the predefined profile and receive a profile setting signal. When the user interface of the external devices 210 receives a profile setting signal, the switching unit 240 may set the predefined profile according to the profile setting signal. In other words, besides the selection of the network service plans, the interaction between the external device 210 and the network apparatus 220 may provide setting of the predefined profile. In addition, in a case where the predefined profile is stored in the profile database DB, the profile database DB may be updated according to user preference and information of service providers.

Figure 5A:
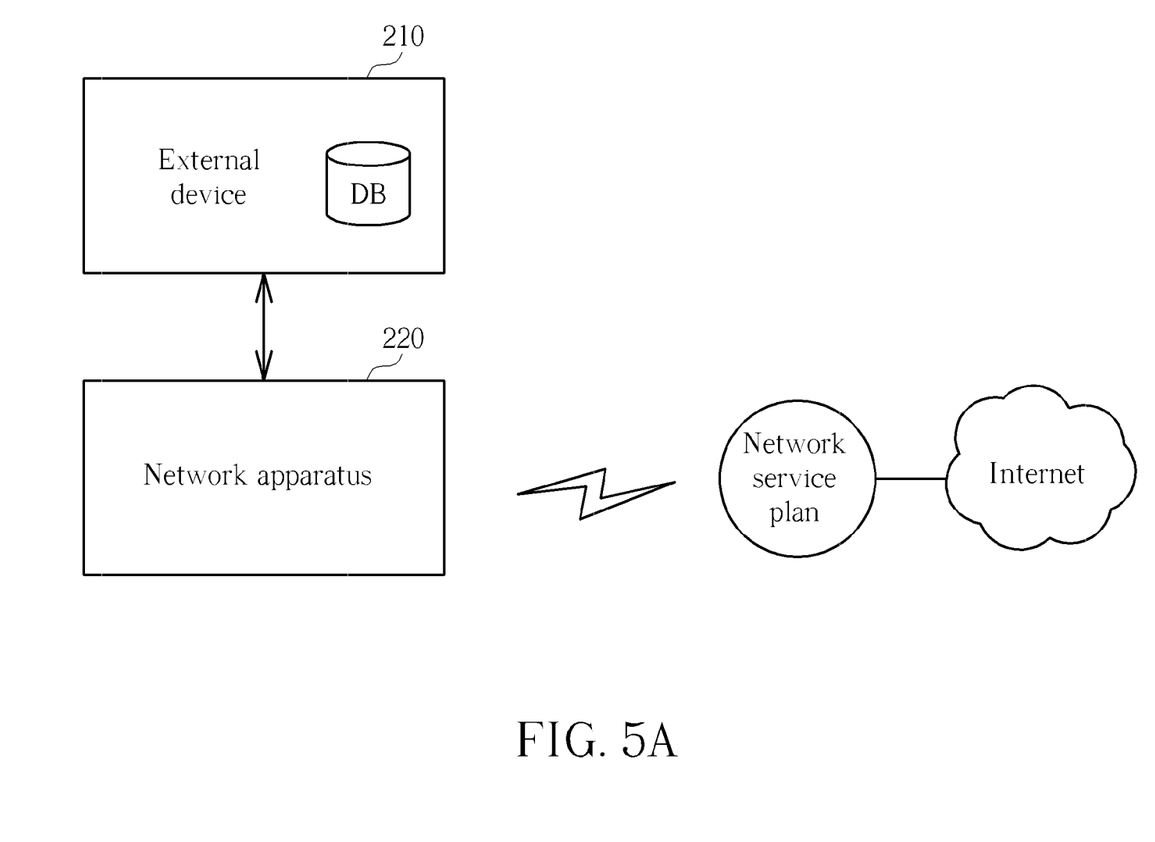
FIG. 5A is diagram illustrating an exemplary implementation of the location of storage of the profile database DB in the network system shown in FIG. 2.
Figure 5B:
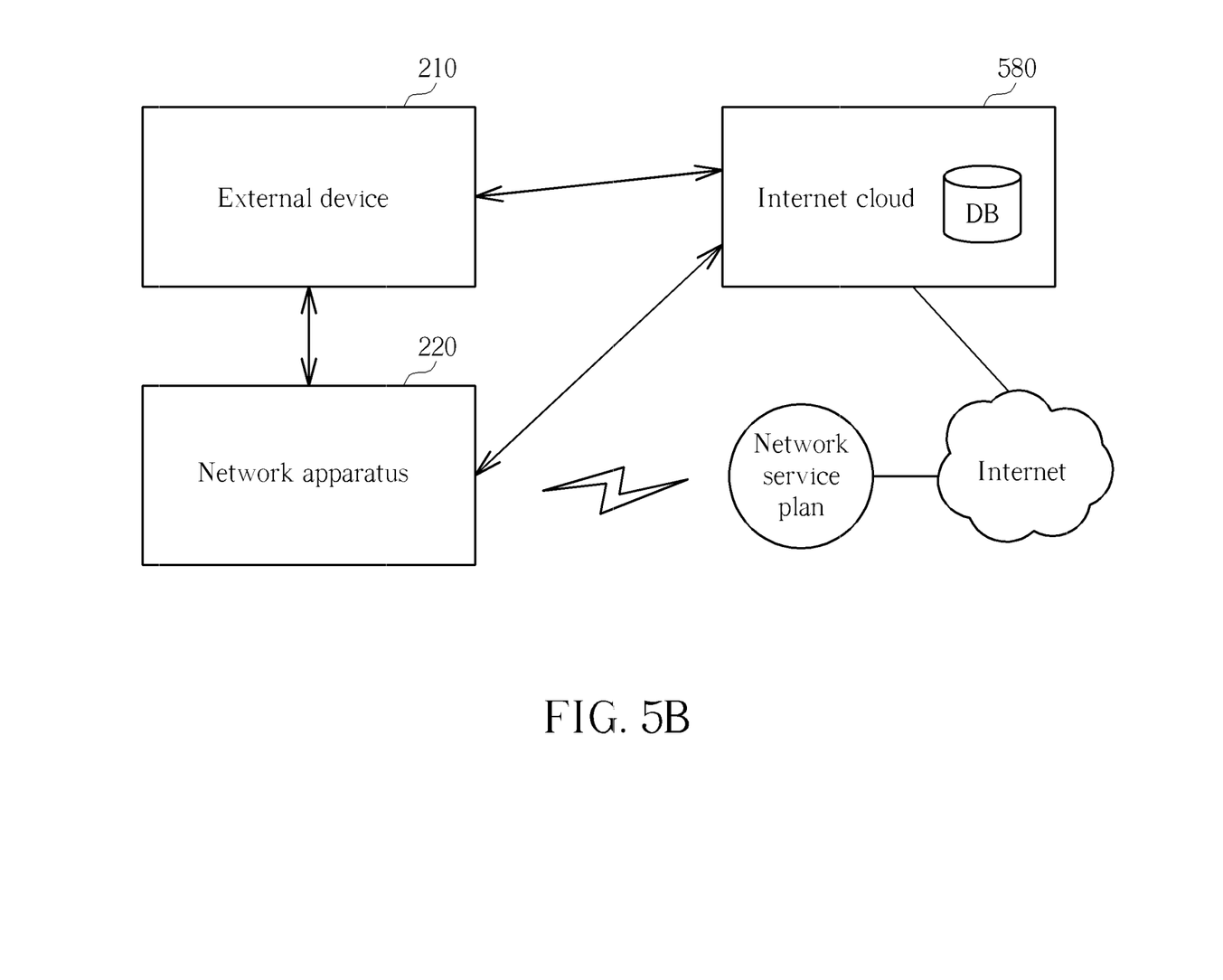
FIG. 5B is diagram illustrating another exemplary implementation of the location of storage position of the profile database DB in the network system shown in FIG. 2.

Furthermore, the profile database DB referred to by the switching unit 240 is not required to be stored in the network apparatus 220. Please refer to FIG. 5A, which is diagram illustrating an exemplary implementation of the location of the storage of the profile database DB in the network system 200 shown in FIG. 2. As shown in FIG. 5A, the profile database DB is stored in the external device 210. Please refer to FIG. 5B, which is diagram illustrating another exemplary implementation of the location of the storage of the profile database DB in the network system 200 shown in FIG. 2. As shown in FIG. 5B, the profile database DB is stored in the Internet cloud 580, and can be accessed by the external device 210 and/or the network apparatus 220.

To sum up, a network apparatus which can automatically switch a network service plan of a currently-used data network to an optimal network service plan according to different communication environments and provide a user with suggestion of available network service plans for selection, and related switching method thereof are provided by present invention. In addition, the network apparatus may have a plurality of UIMs, and is capable of switching between network service plans provided by the UIMs. Therefore, the quality of Internet access can be enhanced greatly and the service charge can be lowered.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network apparatus, comprising:
 a plurality of User Identity Modules (UIMs), for providing a plurality of network service plans, wherein each of the UIMs comprises an integrated circuit; and the network apparatus is located at an access network side, and operates in a first network service plan corresponding to a first UIM of the UIMs to provide the first network service plan for a client terminal externally coupled to the network apparatus;
 a transceiver module, for receiving a plurality of network packets corresponding to the network service plans;
 a switching circuit, coupled to the UIMs and the transceiver module, for obtaining a plurality of corresponding network connection information from the network packets, performing an information-matching operation upon the plurality of corresponding network connection information to generate a matching result by referring to a profile database, and determining if the network apparatus is required to be switched to operate in a second network service plan according to the matching result; and
 a data interface, coupled to the switching circuit, the data interface arranged for connecting the client terminal;
 wherein when it is determined that the network apparatus is required to be switched to operate in the second network service plan, the determining step further comprises checking usage priorities, transmission/throughput rates and charging rates for each respective network service plan, a network service plan in which the network apparatus currently operates is switched from the first network service plan to the second network service plan, and the network apparatus provides the second network service plan for the client terminal.

2. The network apparatus of claim 1, wherein the switching circuit further determines if a switching criterion is met, and obtains the plurality of corresponding network connection information from the network packets only when the switching criterion is met.

3. The network apparatus of claim 2, wherein the switching circuit detects if a switching signal transmitted from the client terminal is received from the data interface, and determines that the switching criterion is met when receiving the switching signal.

4. The network apparatus of claim 2, further comprising:
 a positioning circuit, coupled to the switching circuit, for determining a position of the network apparatus;
 wherein the switching circuit detects if the position of the network apparatus meets a predefined profile, and determines that the switching criterion is met when the position of the network apparatus does not meet the predefined profile.

5. The network apparatus of claim 2, further comprising:
 a positioning circuit, coupled to the switching circuit, for determining a position of the network apparatus;
 wherein the switching circuit detects if the position of the network apparatus is covered by a service area of a network service plan which meets a predefined profile, and determines that the switching criterion is met when the position of the network apparatus is covered by the service area of the network service plan which meets the predefined profile.

6. The network apparatus of claim 2, wherein the switching circuit detects if network connection information of the first network service plan meets a predefined profile, and determines that the switching criterion is met when the network connection information of the first network service plan does not meet the predefined profile.

7. The network apparatus of claim 1, wherein the profile database is stored in the network apparatus, the client terminal externally coupled to the network apparatus, or Internet cloud.

8. The network apparatus of claim 1, wherein when the matching result indicates that network connection information of the second network service plan best meets a predefined profile among the network service plans, the network apparatus is switched to operate in the second network service plan.

9. The network apparatus of claim 1, wherein the second network service plan is provided by a second UIM of the UIMs where the second UIM is different from the first UIM, or is a network service plan provided by the first UIM where the network service plan is different from the first network service plan.

10. A network system, comprising:
 a network apparatus, comprising:
  a plurality of User Identity Modules (UIMs), for providing a plurality of network service plans, wherein each of the UIMs comprises an integrated circuit; and the network apparatus is located at an access network side, and operates in a first network service plan according to a first UIM of the UIMs to provide the first network service plan for a client terminal externally coupled to the network apparatus;
  a transceiver module, for receiving a plurality of network packets corresponding to the network service plans;
  a switching circuit, coupled to the UIMs and the transceiver module, for obtaining a plurality of corresponding network connection information from the network packets, performing an information-matching operation upon the plurality of corresponding network connection information to generate a matching result by referring to a profile database, and generating a selectable list of available network service plans according to the matching result; and a data interface, coupled to the switching circuit, the data interface for connecting the client terminal; and a user interface, for displaying the selectable list, and receiving a selection signal corresponding to the selectable list;

wherein the switching circuit determines if the network apparatus is required to be switched to operate in a second network service plan according to the selection signal; and when it is determined that the network apparatus is required to be switched to operate in the second network service plan, the determining step further comprises checking usage priorities, transmission/throughput rates and charging rates for each respective network service plan, a network service plan in which the network apparatus currently operates is switched from the first network service plan to the second network service plan, and the network apparatus provides the second network service plan for the client terminal.

11. The network system of the claim 10, wherein the user interface further displays a predefined profile and receives a profile setting signal, and the switching circuit sets the predefined profile according to the received profile setting signal.

12. The network system of the claim 10, wherein the switching circuit further determines if a switching criterion is met, and obtains the plurality of corresponding network connection information from the network packets only when the switching criterion is met.

13. The network system of the claim 12, wherein the network apparatus further comprises:

a positioning circuit, coupled to the switching circuit, for determining a position of the network apparatus;

wherein the switching circuit detects if the position of the network apparatus meets a predefined profile, and determines that the switching criterion is met when the position of the network apparatus does not meet the predefined profile.

14. The network system of the claim 12, wherein the network apparatus further comprises:

a positioning circuit, coupled to the switching circuit, for determining a position of the network apparatus;

wherein the switching circuit detects if the position of the network apparatus is covered by a service area of a network service plan which meets a predefined profile, and determines that the switching criterion is met when the position of the network apparatus is covered by the service area of the network service plan which meets the predefined profile.

15. The network system of the claim 12, wherein the switching circuit detects if network connection information of the first network service plan meets a predefined profile, and determines that the switching criterion is met when the network connection information of the first network service plan does not meet the predefined profile.

16. The network system of the claim 10, wherein when the matching result indicates that network connection information of the second network service plan best meets a predefined profile among the network service plans, the network apparatus is switched to operate in the second network service plan.

17. A method of switching a data network for a network apparatus, comprising:

disposing a plurality of User Identity Modules (UIMs) each comprising an integrated circuit in the network apparatus;

utilizing the UIMs to provide a plurality of network service plans, wherein the network apparatus is located at an access network side, and operates in a first network service plan corresponding to a first UIM of the UIMs to provide the first network service plan for a client terminal externally coupled to the network apparatus;

receiving a plurality of network packets corresponding to the network service plans provided by the UIMs for obtaining a plurality of network connection information corresponding to the network service plans;

performing an information-matching operation upon the plurality of network connection information to generate a matching result by referring to a profile database; and determining if the network apparatus is required to be switched to operate in a second network service plan according to the matching result;

wherein when it is determined the network apparatus is required to be switched to operate in the second network service plan, the determining step further comprises checking usage priorities, transmission/throughput rates and charging rates for each respective network service plan, a network service plan in which the network apparatus currently operates is switched from the first network service plan to the second network service plan, and the network apparatus provides the second network service plan for the client terminal externally coupled to the network apparatus.

18. The method of claim 17, further comprising:

determining if a switching criterion is met;

wherein only when the switching criterion is met, the step of obtaining the plurality of network connection information corresponding to the network service plans is executed.

19. The method of claim 17, wherein the step of determining if the network apparatus is required to be switched to operate in the second network service plan according to the matching result comprises:

when the matching result indicates that network connection information of the second network service plan best meets a predefined profile among the network service plans, switching the network apparatus to the second network service plan.

20. The method of claim 17, wherein the step of determining if the network apparatus is required to be switched to operate in the second network service plan according to the matching result comprises:

generating a selectable list of available network service plans according to the matching result;

displaying the selectable list on a user interface; and receiving a selection signal corresponding to the selectable list, and determining if the network apparatus is required to be switched to operate in the second network service plan according to the selection signal.

* * * * *